(12) United States Patent
Suda et al.

(10) Patent No.: US 11,088,595 B2
(45) Date of Patent: Aug. 10, 2021

(54) ROTOR STRUCTURE FOR OUTER ROTOR ELECTRIC MOTOR

(71) Applicant: SAWAFUJI ELECTRIC CO., LTD., Ota (JP)

(72) Inventors: Manabu Suda, Ota (JP); Tetsuo Morinaga, Ota (JP); Koki Kakuage, Ota (JP); Takahiro Sugai, Ota (JP)

(73) Assignee: Sawafuji Electric Co., Ltd., Gunma (JP)

( * ) Notice: Subject to any disclaimer, the term of this patent is extended or adjusted under 35 U.S.C. 154(b) by 110 days.

(21) Appl. No.: 16/615,673

(22) PCT Filed: May 17, 2018

(86) PCT No.: PCT/JP2018/019133
§ 371 (c)(1),
(2) Date: Nov. 21, 2019

(87) PCT Pub. No.: WO2018/216599
PCT Pub. Date: Nov. 29, 2018

(65) Prior Publication Data
US 2020/0119620 A1 Apr. 16, 2020

(30) Foreign Application Priority Data
May 23, 2017 (JP) .............................. JP2017-101652

(51) Int. Cl.
*H02K 9/06* (2006.01)
*H02K 1/27* (2006.01)
(Continued)

(52) U.S. Cl.
CPC ............. *H02K 9/06* (2013.01); *H02K 1/2786* (2013.01); *H02K 1/28* (2013.01); *H02K 21/22* (2013.01)

(58) Field of Classification Search
CPC .......... H02K 9/06; H02K 1/2786; H02K 1/28; H02K 21/22; H02K 15/03; H02K 5/08; H02K 15/12
See application file for complete search history.

(56) References Cited

U.S. PATENT DOCUMENTS

2018/0219446 A1* 8/2018 Yamada ................ F04D 29/329

FOREIGN PATENT DOCUMENTS

CN       1280412 A     1/2001
CN      205583970 U     9/2016
(Continued)

OTHER PUBLICATIONS

Official Communication dated Dec. 3, 2020 issued in the corresponding Chinese Patent Application No. 201880033597.6.

*Primary Examiner* — Thomas Truong
(74) *Attorney, Agent, or Firm* — Carrier Blackman & Associates, P.C.; Joseph P. Carrier; William D. Blackman

(57) ABSTRACT

An outer rotor electric motor is provided in which a rotor having a rotor case and a plurality of permanent magnets fixed to an inner periphery of the rotor case is disposed so as to cover a stator, and an end part of a rotating shaft is fastened to the end wall by a fastening member having part thereof exposed to an exterior from an upper face of the end wall of the rotor case, wherein a plurality of cooling blades are provided with the end wall so as to extend radially while projecting downward from of the end wall, radially extending grooves for discharging water are formed in the end wall so as to individually correspond to the cooling blades, and a plurality of cooling air discharge holes that discharge air from the cooling blade are formed in the side wall of the rotor case.

6 Claims, 11 Drawing Sheets

(51) Int. Cl.
*H02K 21/22* (2006.01)
*H02K 1/28* (2006.01)

(56) References Cited

FOREIGN PATENT DOCUMENTS

| | | |
|---|---|---|
| DE | 3329720 A1 | 2/1984 |
| JP | 2000-270517 A | 9/2000 |
| JP | 2001-061256 A | 3/2001 |
| JP | 2005-192363 A | 7/2005 |
| JP | 2007-089282 A | 4/2007 |
| JP | 2008-154369 A | 7/2008 |
| JP | 2015-017547 A | 1/2015 |
| WO | 2014/160268 A1 | 10/2014 |
| WO | 2017/051784 A1 | 3/2017 |

* cited by examiner

FIG.5
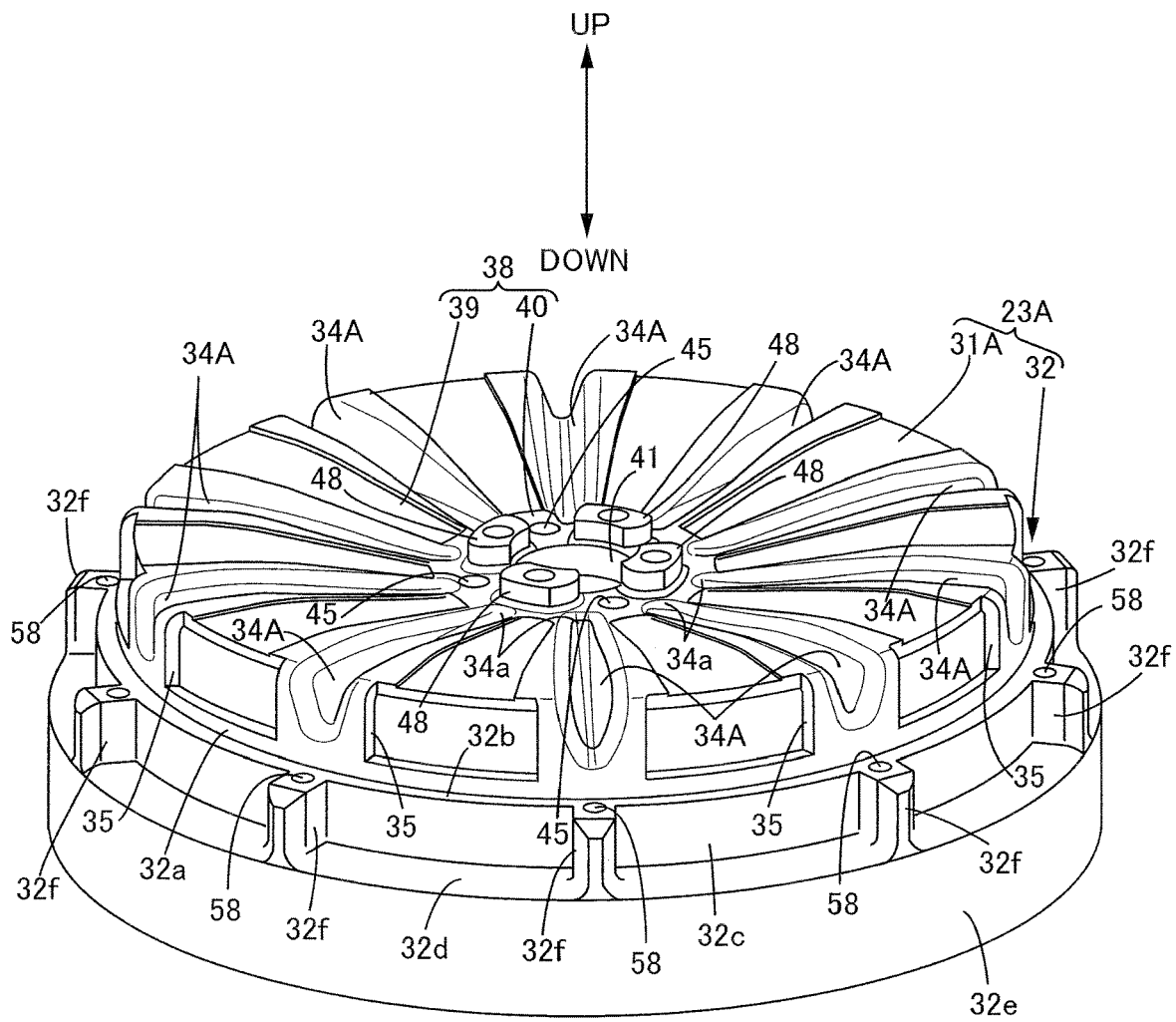
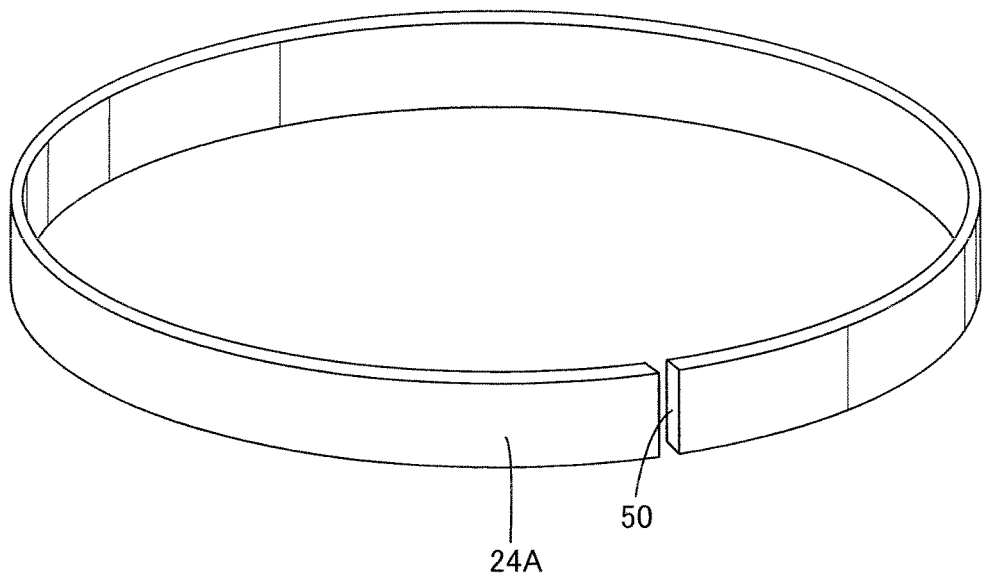

ROTOR STRUCTURE FOR OUTER ROTOR ELECTRIC MOTOR

TECHNICAL FIELD

The present invention relates to an outer rotor electric motor in which a rotor equipped with a rotor case formed into a plate shape having a circular end wall and a cylindrical side wall connected to the outer periphery of the end wall, and a plurality of permanent magnets fixed to an inner periphery of the side wall is disposed so as to cover from above a stator fixed to a casing by means of the end wall and so as to cover the stator from an outside by means of the side wall, and an upper end part of a rotating shaft having a vertically extending axis and being rotatably supported on the casing is fastened to a central part of the end wall by means of a fastening member having part thereof exposed to an exterior from an upper face of the end wall.

BACKGROUND ART

Such an outer rotor electric motor is already known from Patent Document 1, etc., and in this arrangement screwing a nut abutting against an upper face of an end wall of a rotor case onto an upper end part of a rotating shaft extending through a central part of the end wall fixes the rotating shaft to the central part of the rotor case. On the other hand, an outer rotor electric motor in which a cooling fan for cooling a stator is provided on a rotor case is known from Patent Document 2 and Patent Document 3.

RELATED ART DOCUMENTS

Patent Documents

Patent Document 1: Japanese Patent Application Laid-open No. 2005-192363
Patent Document 2: Japanese Patent Application Laid-open No. 2000-270517
Patent Document 3: Japanese Patent Application Laid-open No. 2007-89282

SUMMARY OF THE INVENTION

Problems to be Solved by the Invention

The outer rotor electric motors disclosed in Patent Documents 2 and 3 above employ a rotating shaft that extends horizontally, a cooling blade is provided integrally with an end wall of the rotor case, and an air through hole is formed therein. In an outer rotor electric motor such as one disclosed in Patent Document 1 above in which the axis of the rotating shaft extends in the vertical direction, the end wall of the rotor case is disposed so as to cover a stator from above; in order to prevent rain water or the like from entering, the end wall has to be formed into a completely closed shape, and there is a possibility that rain water or the like will build up on an upper face of the end wall. Moreover, in a case in which part of a fastening member for fastening the upper end part of the rotating shaft to the end wall is exposed to the exterior from the end wall, there is a possibility that the fastening member will become rusty due to rain water or the like building up on the upper face of the end wall.

The present invention has been accomplished in light of such circumstances, and it is an object thereof to provide an outer rotor electric motor in which a central part of an end wall of a rotor case is fastened to an upper end part of a vertically extending rotating shaft, the rotor structure thereof having a cooling blade provided on the end wall of the rotor case and yet making it possible to prevent rain water or the like from building up on an upper face of the end wall.

Means for Solving the Problems

In order to attain the above object, according to a first aspect of the present invention, there is provided a rotor structure for an outer rotor electric motor in which a rotor comprising a rotor case formed into a plate shape having a circular end wall and a cylindrical side wall connected to an outer periphery of the end wall, and a plurality of permanent magnets fixed to an inner periphery of the side wall is disposed so as to cover from above by means of the end wall a stator fixed to a casing and so as to cover the stator from an outside by means of the side wall, and an upper end part of a rotating shaft having a vertically extending axis and being rotatably supported on the casing is fastened to a central part of the end wall by means of a fastening member having part thereof exposed to an exterior from an upper face of the end wall, characterized in that a plurality of cooling blades that suck in cooling air for cooling the stator from beneath the stator are provided integrally with the end wall so as to extend radially or spirally while projecting downward from a lower face of the end wall, radially or spirally extending grooves for discharging water from a central part of the upper face of the end wall are formed in the upper face of the end wall so as to individually correspond to the cooling blades, and a plurality of cooling air discharge holes that discharge air from the cooling blade to the exterior are formed in the side wall.

Further, according to a second aspect of the present invention, in addition to the first aspect, a recess part is formed in the central part of the upper face of the end wall, and the upper end part of the rotating shaft is fastened to a lower face of a bottom wall of the recess part.

According to a third aspect of the present invention, in addition to the second aspect, an inner end portion of the groove along a radial direction of the end wall is formed so as to be deeper than the recess part.

Moreover, according to a fourth aspect of the present invention, in addition to any one of the first to third aspects, a ring-shaped yoke made of a magnetic metal is fixed to the inner periphery of the side wall, and the permanent magnet is a resin-bonded permanent magnet that is mold bonded to an inner peripheral face of the yoke by injection molding.

In addition, a third bolt 47 of an embodiment corresponds to the fastening member of the present invention.

Effects of the Invention

In accordance with the first aspect of the present invention, since the plurality of radially or spirally extending cooling blades are projectingly provided on the lower face of the end face of the rotor case, and the plurality of cooling air discharge holes are provided in the side wall of the rotor case, it is possible for air sucked in from beneath the stator by means of the cooling blades due to rotation of the rotor case to pass through the stator and thus cool the stator. Moreover, since the radially or spirally extending grooves for discharging water building up on the upper face of the end wall are formed in the upper face of the end wall so as to individually correspond to the cooling blades, it is possible to simultaneously form the cooling blade and the groove while suppressing any increase in the number of components and any increase in the weight of the rotor case, and despite the cooling blade being provided on the end wall of the rotor case it is possible to prevent the fastening member from becoming rusty by preventing rain water or the like from building up on the upper face of the end wall while simplifying the production process and reducing the cost.

Furthermore, in accordance with the second aspect of the present invention, since the upper end part of the rotating shaft is fastened to the lower face of the bottom wall of the recess part formed in the central part of the upper face of the end wall, it is possible to shorten the rotating shaft as much as possible and lighten the weight, and it is also possible to ensure that there is a space for disposing the cooling blade while suppressing the axial length of the rotor case.

In accordance with the third aspect of the present invention, since the inner end portion of the groove along the radial direction of the end wall is formed so as to be deeper than the recess part, it is possible to discharge water from the central part of the end wall even in a state in which the rotor is not rotating.

Moreover, in accordance with the fourth aspect of the present invention, due to the resin-bonded permanent magnet, formed by injection molding, being mold bonded to the inner peripheral face of the yoke, it is possible to further lighten the weight, and it becomes easy to make the central axis of the rotor case, the central axis of the rotating shaft, and the central axis of the inner peripheral face of the permanent magnet coincide, thereby facilitating assembly of the permanent magnet.

BRIEF DESCRIPTION OF DRAWINGS

FIG. 5 is an exploded perspective view of the rotor case and a yoke from above. (first embodiment)

EXPLANATION OF REFERENCE NUMERALS AND SYMBOLS

Figure 1:
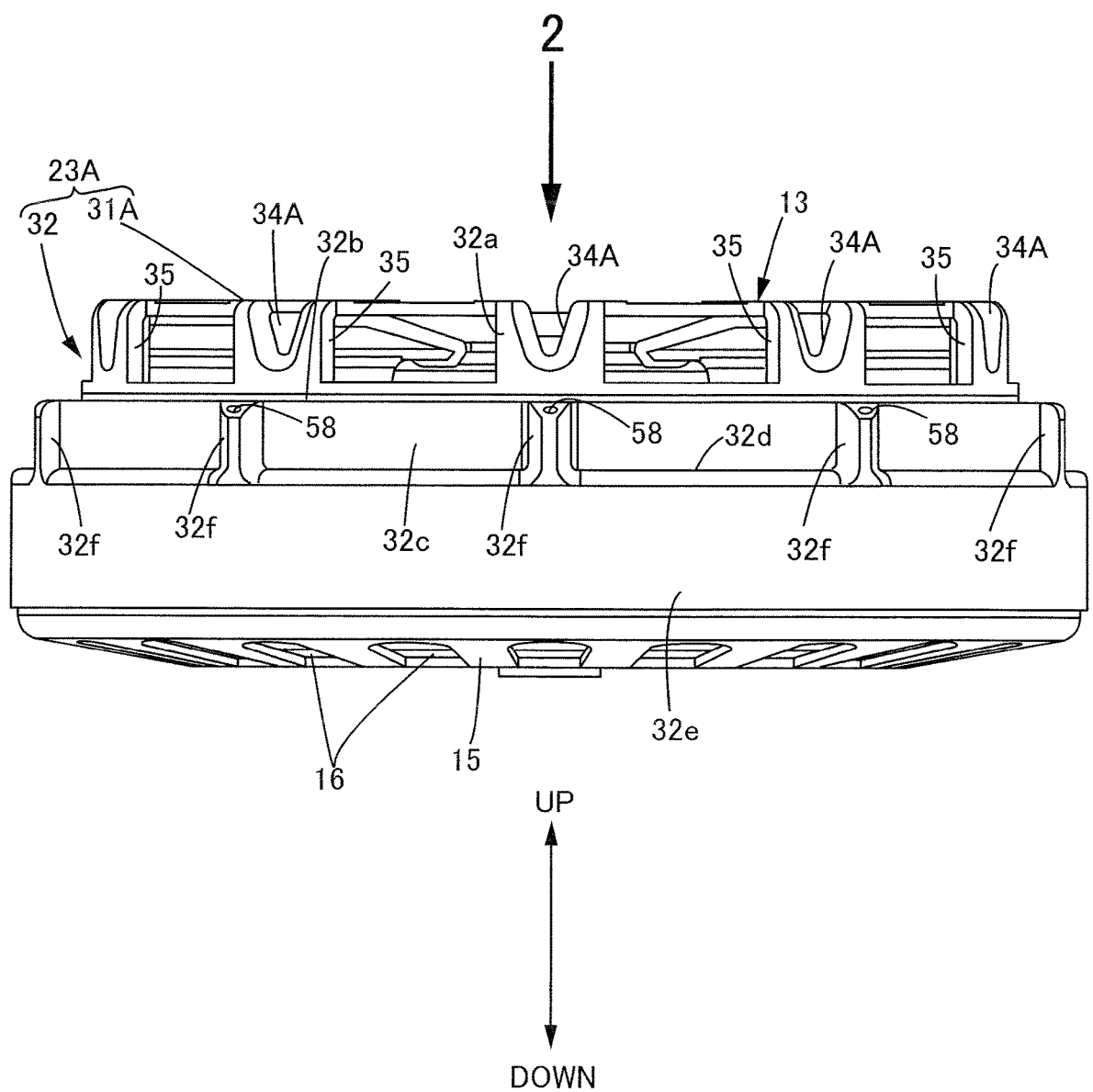
FIG. 1 is a side view of an outer rotor electric motor of a first embodiment. (first embodiment)
Figure 2:
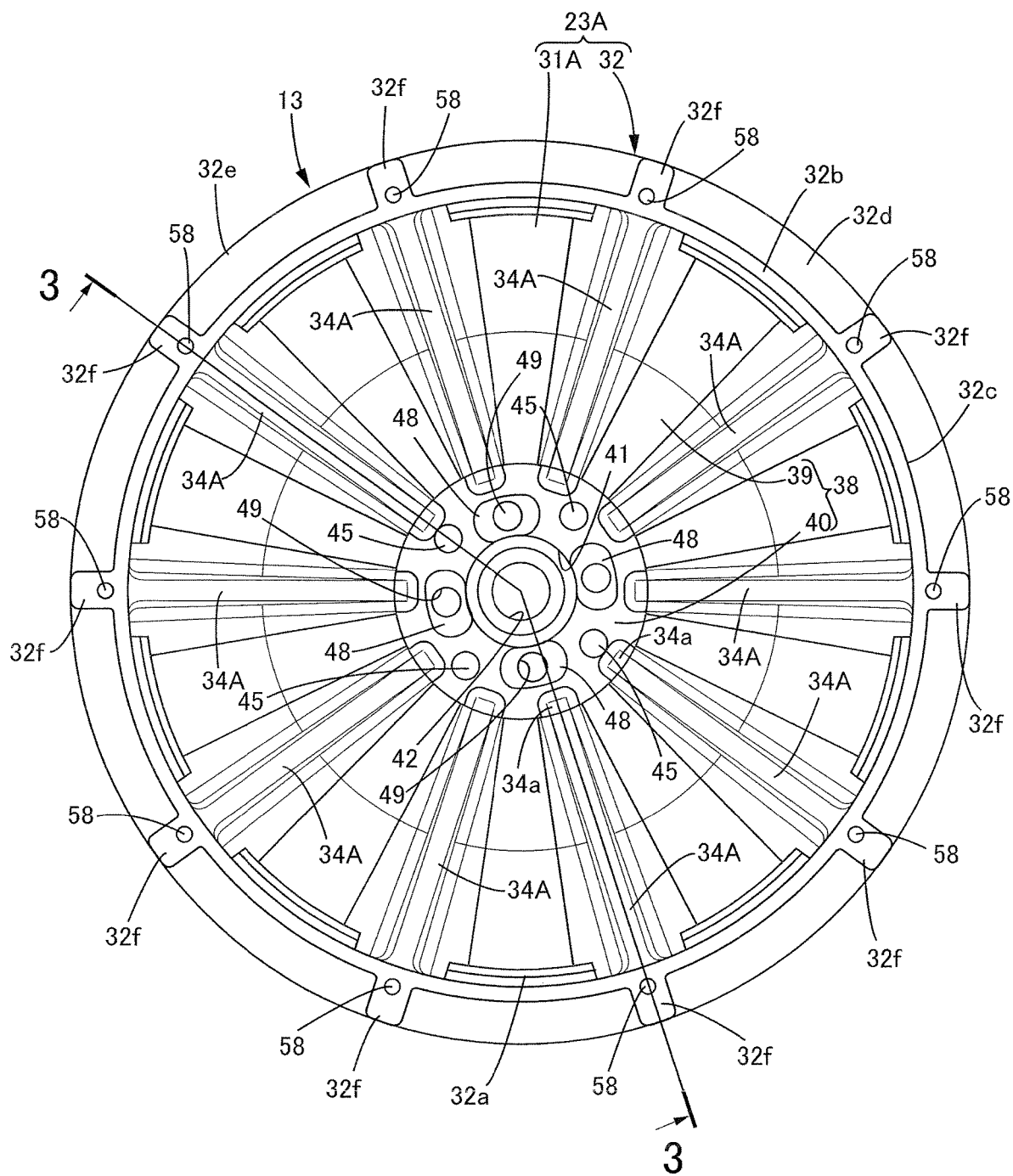
FIG. 2 is a plan view from arrow 2 in FIG. 1. (first embodiment)
Figure 3:
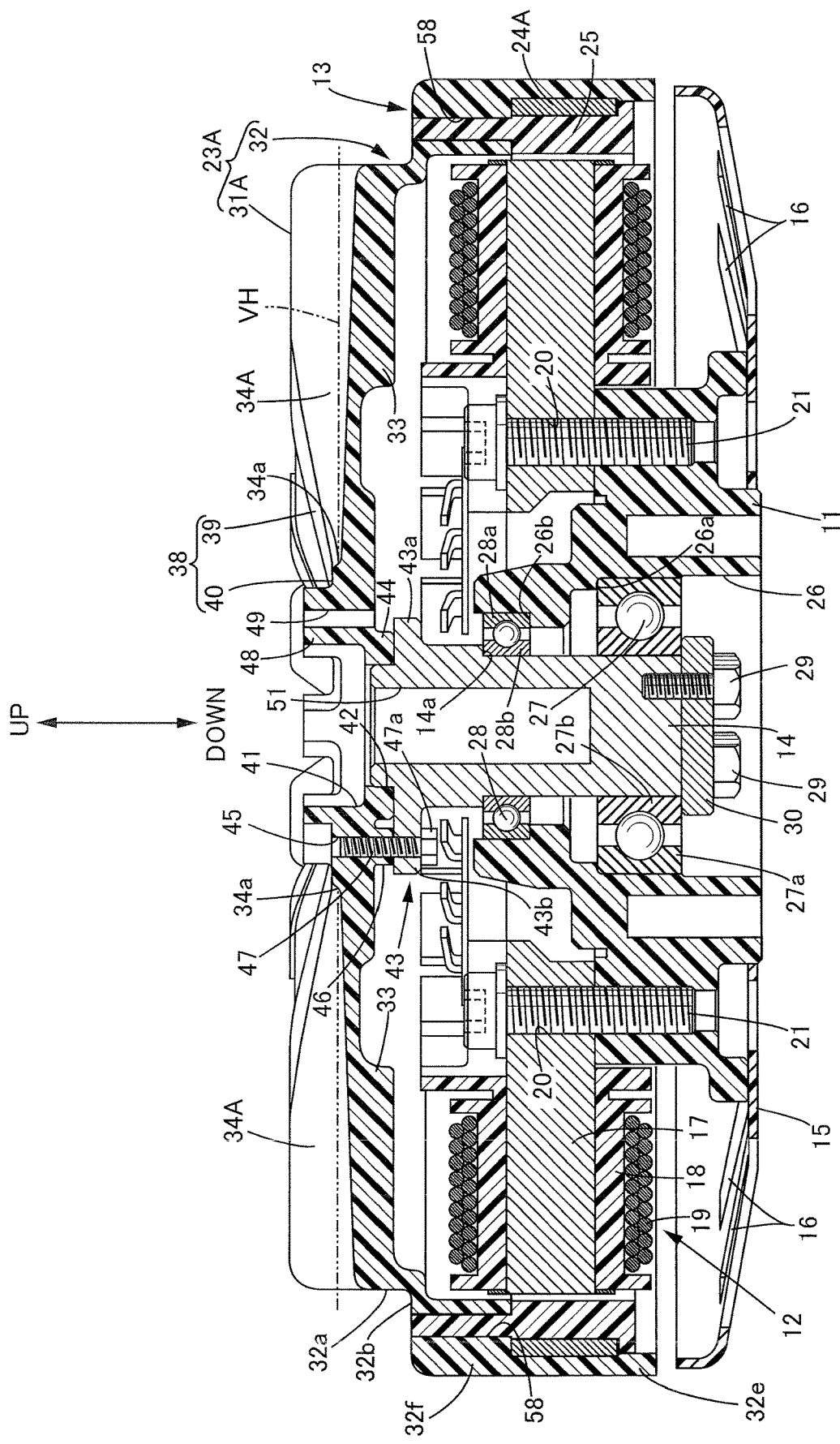
FIG. 3 is a sectional view along line 3-3 in FIG. 2. (first embodiment)

11 Casing
12 Stator
13 Rotor
14 Rotating shaft
23A, 23B Rotor case
24A, 24B, 24C, 24D, 24E Yoke
25 Permanent magnet
31A, 31B End wall
32 Side wall
33 Cooling blade
34A, 34B Groove
34a Inner end portion of groove
35 Cooling air discharge hole
38 Recess part
40 Bottom wall
47 Third bolt, which is a fastening member

MODES FOR CARRYING OUT THE INVENTION

Embodiments of the present invention are explained below by reference to the attached drawings.

First Embodiment

A first embodiment of the present invention is explained by reference to FIG. 1 to FIG. 6. First, in FIG. 1 to FIG. 3, this outer rotor electric motor is used in for example a drone, and includes a stator 12 fixed to a casing 11 and a rotor 13 covering the stator 12, the rotor 13 being fixed to an upper end part of a rotating shaft 14 vertically extending and disposed coaxially with the stator 12. A cover 15 covering the casing 11 from below is mounted on the casing 11, and a plurality of cooling air inlet holes 16 for cooling air to flow through are formed in the cover 15.

The stator 12 includes a ring-shaped stator core 17 formed by layering and joining a plurality of magnetic steel plates, a bobbin 18 made of a synthetic resin and fitted onto the stator core 17, and a coil 19 wound around the bobbin 18, and screwing a first bolt 21 inserted through a through hole 20 provided at a plurality of locations spaced in the peripheral direction of the stator core 17 into the casing 11 and tightening fixes the stator 12 to the casing 11.

The rotor 13 is formed from a rotor case 23A made of a light metal or a synthetic resin and fastened to the rotating shaft 14, a ring-shaped yoke 24A made of a magnetic metal and press fitted into an inner peripheral face of the rotor case 23A, and a plurality of permanent magnets 25 provided on an inner peripheral face of the yoke 24A, the light metal being for example aluminum, magnesium or titanium, etc.

A support hole 26 having a vertically extending axis is provided in a central part of the casing 11, and a lower end part of the rotating shaft 14 inserted through the support hole 26 is rotatably supported on the casing 11 via a first ball bearing 27. That is, a first annular step portion 26a facing downward is formed on a lower part of the support hole 26, an upper face of an outer race 27a of the first ball bearing 27 is abutted against the first annular step portion 26a, and an outer peripheral part of a disk-shaped plate 30 fastened to the lower end part of the rotating shaft 14 by means of a plurality of second bolts 29 is disposed so as to closely oppose a lower face of an inner race 27b of the first ball bearing 27.

An intermediate part of the rotating shaft 14 is rotatably supported on the casing 11 via a second ball bearing 28. That is, a second annular step portion 26b facing upward is formed on an upper part of the support hole 26, a lower face of an outer race 28a of the second ball bearing 28 is abutted against the second annular step portion 26b, and a third annular step portion 14a formed on an intermediate part of the rotating shaft 14 and facing downward is abutted against an upper face of an inner race 28b of the second ball bearing 28.

Figure 4:
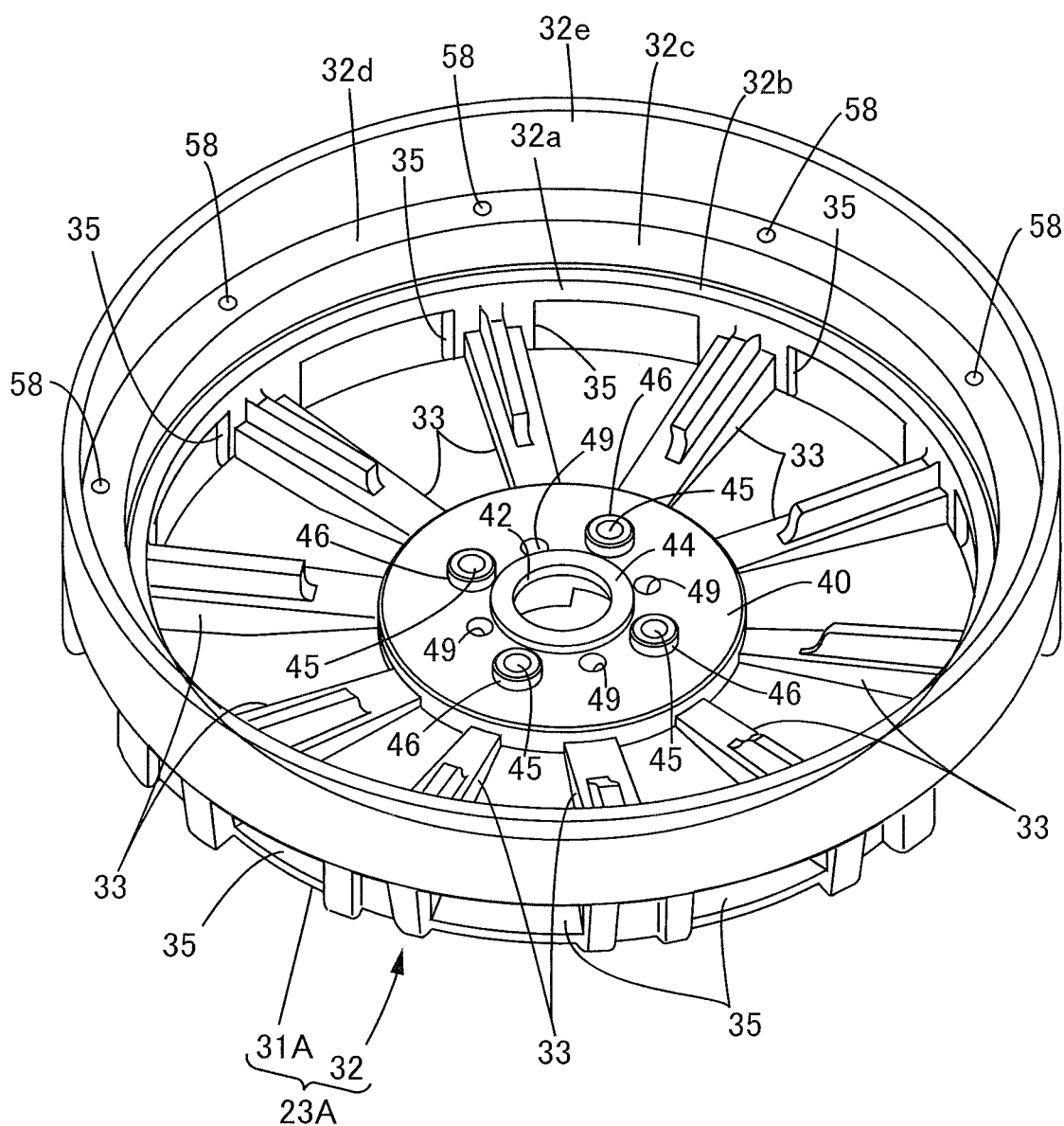
FIG. 4 is a perspective view when a rotor case is viewed from below. (first embodiment)

Referring in addition to FIG. 4 and FIG. 5, the rotor case 23A is formed into a plate shape opening downward while integrally having a circular end wall 31A covering the stator 12 from above and a cylindrical side wall 32 connected to the outer periphery of the end wall 31A so as to cover the stator 12 from the outside.

The side wall 32 is formed into a stepped cylindrical shape by coaxially connecting a first cylindrical portion 32a having a cylindrical shape and connected to the outer periphery of the end wall 31A, a second cylindrical portion 32c formed so as to have a larger diameter than that of the first cylindrical portion 32a so as to form a fourth annular step portion 32b facing upward between itself and the lower end of the first cylindrical portion 32a, and a third cylindrical portion 32e formed so as to have a larger diameter than that of the second cylindrical portion 32c so as to form a fifth annular step portion 32d facing upward between itself and the lower end of the second cylindrical portion 32c. A vertically extending reinforcing rib 32f is integrally formed at a plurality of locations (ten locations in the first embodiment) equally spaced in the peripheral direction of the second cylindrical portion 32c and the fifth annular step portion 32d.

A plurality (ten in the first embodiment) of cooling blades 33 sucking in cooling air for cooling the stator 12 from beneath the stator 12, that is, from the cooling air inlet hole 16 formed in the cover 15 are provided integrally with the end wall 31A so as to extend radially while protruding downward from a lower face of the end wall 31A and have an outer end part connected to the first cylindrical portion 32a of the side wall 32 in a portion corresponding to the reinforcing rib 32f. A plurality (ten in the first embodiment) of cooling air discharge holes 35 discharging air from the cooling blade 33 to the exterior are formed in the first cylindrical portion 32a of the side wall 32 so as to be disposed between the reinforcing ribs 32f.

A recess part 38 is formed in a central part of an upper face of the end wall 31A. The recess part 38 is formed into a bowl shape in the first embodiment from a tapered inclined wall 39 having a decreasing diameter in going toward the central part of the end wall 31A in this embodiment and a bottom wall 40 connected to the lower end of the inclined wall 39, but may be formed so as to generate a stair-like step. Formed in a central part of the bottom wall 40 are a cutout hole 41 and a fitting hole 42 coaxially connected to the lower end of the cutout hole 41 and having a smaller diameter than that of the cutout hole 41.

Formed in the upper face of the end wall 31A so as to individually correspond to the cooling blades 33 are grooves 34A extending radially from the recess part 38 to the outer periphery of the end wall 31A in order to discharge water from the central part of the upper face of the end wall 31A.

With regard to the groove 34A, its bottom part is formed in an inclined manner so as to be positioned further downward in going outward in the radial direction of the end wall 31A, and an inner end portion 34a of the groove 34A along the radial direction of the end wall 31A is formed so as to be deeper than the recess part 38. That is, the bottom of the inner end portion 34a of the groove 34A is positioned further downward than an upper face of the bottom wall 40 of the recess part 38, and the bottom of the groove 34A is inclined so as to go away from a virtual horizontal plane VH passing through the bottom of the inner end portion 34a in going outward in the radial direction of the end wall 31A.

The upper end part of the rotating shaft 14 is fastened to a lower face of the bottom wall 40 of the recess part 38 in the central part of the upper face of the end wall 31A, a flange 43 is formed integrally with the upper end part of the rotating shaft 14, and a portion, projecting from the flange 43, of the upper end part of the rotating shaft 14 is fitted into the fitting hole 42 of the end wall 31A. A bottomed cutout hole 51 having its upper end opening in the cutout hole 41 is formed in the rotating shaft 14 so as to be coaxial therewith.

A ring-shaped support abutment projecting part 44 forming part of the fitting hole 42 is projectingly provided on the lower face of the bottom wall 40, and a first mounting boss 46 is integrally and projectingly provided on the lower face of the bottom wall 40 at a plurality of locations (for example four locations) equally spaced in the peripheral direction of the cutout hole 41, the first mounting boss 46 forming part of a first mounting hole 45 disposed in an area around the cutout hole 41 and projecting downward.

On the other hand, the flange 43 is formed so as to integrally have a ring-shaped flange base portion 43a abutting against the support abutment projecting part 44 from below, and a plurality of (for example four) mounting arm portions 43b protruding outward from the flange base portion 43a so as to abut against the first mounting boss 46 from below. Inserting a third bolt 47 as a fastening member, having an enlarged diameter head portion 47a abutting against and engaging with the mounting arm portion 43b from below, through the mounting arm portion 43b and screwing it into the first mounting hole 45 fastens the upper end part of the rotating shaft 14 to the lower face of the bottom wall 40 of the end wall 31A. Moreover, the upper end of the first mounting hole 45 is open on the upper face of the bottom wall 40, and part of the third bolt 47 (an upper end part in the embodiment) is exposed to the exterior from the end wall 31A.

A second mounting boss 48 disposed between the first mounting holes 45 around the cutout hole 41 is projectingly provided integrally with the upper face of the bottom wall 40 so as to project upward while having a second mounting hole 49, and a propeller (not illustrated) of the drone is fastened to the second mounting bosses 48.

Referring to FIG. 5, the yoke 24A is desirably formed into a ring shape having a slit 50 at one location in the peripheral direction and is press fitted into the inner periphery of the third cylindrical portion 32e of the rotor case 23A.

The plurality of permanent magnets 25 are resin-bonded permanent magnets that are connected in series and integrated with each other; they are mold bonded to an inner peripheral face of the yoke 24A (by resin fixing due to molding and the magnetic attractive force between the resin-bonded magnet and the yoke 24A) so that they have a ring shape overall, the outer peripheral side and the inner peripheral side thereof are polarized into a north pole and a south pole, and the poles adjacent to each other in the peripheral direction of the yoke 24A have different polarities on the outer peripheral side and the inner peripheral side. It is also desirable in order to prevent degradation of the performance that the north pole and the south pole of the permanent magnets 25 are magnetized so that the slit 50 of the yoke 24A is positioned in the central part in the peripheral direction of the north pole or the south pole.

Figure 6:
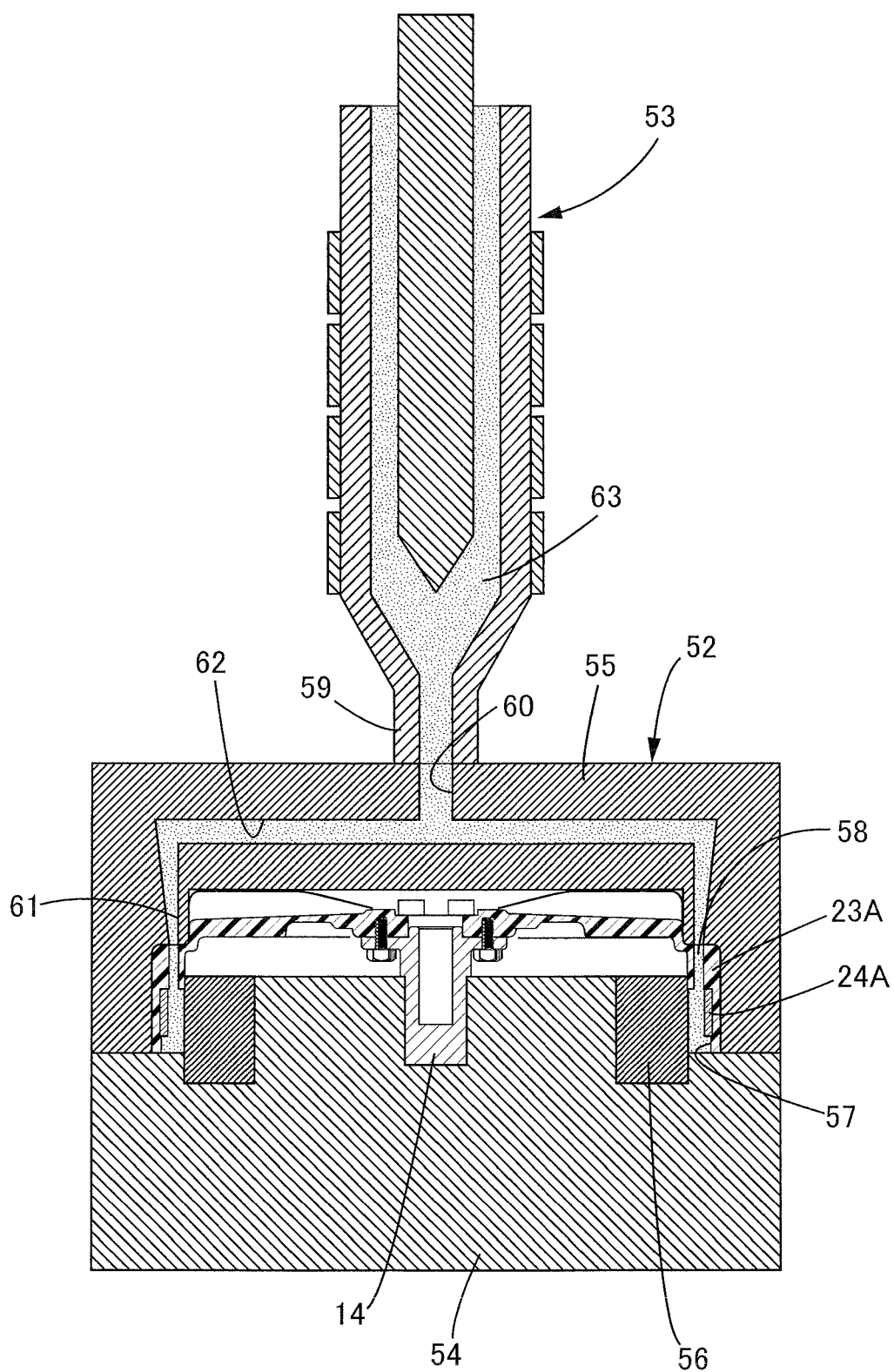
FIG. 6 is a vertical sectional view of a molding device and an injection device used for injection molding a permanent magnet. (first embodiment)

When injection molding the permanent magnets 25, as shown in FIG. 6, a molding device 52 and an injection device 53 are used. The molding device 52 includes a first mold 54, a second mold 55 holding between itself and the first mold 54 the rotor case 23A having the rotating shaft 14 fastened thereto and the yoke 24A press fitted thereinto, and a ring-shaped magnetizing magnet 56 mounted on the first mold 54. A cavity 57 is formed by cooperation of the first mold 54, the second mold 55, the magnetizing magnet 56, the rotor case 23A, and the yoke 24A. On the other hand, formed in advance in the plurality of reinforcing ribs 32f of the rotor case 23A are injection inlets 58 for introducing a hot molten material into the cavity 57 at the time of injection molding the permanent magnets 25.

Formed in the second mold 55 are a sprue 60 connected to a nozzle 59 at the extremity of the injection device 53, a plurality of gates 61 communicating with the injection inlets 58, and a runner 62 joining the gate 61 and the sprue 60. A powder material 63 formed by covering a magnetic powder with a coating resin is heated, melted, and then injected from the nozzle 59 of the injection device 53, it being injected into the cavity 57 from the nozzle 59 via the sprue 60, the runner 62, the gate 61 and the injection inlet 58. The hot molten material 63 is magnetized by means of the magnetizing magnet 56 at the same time as molding in the cavity 57, and the permanent magnets 25, which are resin-bonded permanent magnets integrated into a ring shape, are mold bonded to the inner peripheral face of the yoke 24A.

The operation of the first embodiment is now explained. The rotor 13 of the outer rotor electric motor includes the rotor case 23A, which is formed into a plate shape having the circular end wall 31A and the cylindrical side wall 32 connected to the outer periphery of the end wall 31A, and the plurality of permanent magnets 25, which are fixed to the inner periphery of the side wall 32, and the upper end part of the rotating shaft 14 having a vertically extending axis is fastened to the central part of the end wall 31A by means of the third bolt 47 having part thereof exposed to the exterior from the upper face of the end wall 31A. Since the plurality of cooling blades 33, which suck in cooling air for cooling the stator 12 from beneath the stator 12, are provided integrally with the end wall 31A so as to extend radially while projecting downward from the lower face of the end wall 31A, the radially extending grooves 34A for discharging water from the central part of the upper face of the end wall 31A are formed in the upper face of the end wall 31A so as to individually correspond to the cooling blades 33, and the plurality of cooling air discharge holes 35, which discharge air from the cooling blade 33 to the exterior, are formed in the side wall 32, it is possible for air sucked in from beneath the stator 12 by means of the cooling blade 33 due to rotation of the rotor case 23A to pass through the stator 12 and cool the stator 12. Moreover, since the radially extending grooves 34A for discharging water that has built up on the upper face of the end wall 31A are formed in the upper face of the end wall 31A so as to individually correspond to the cooling blades 33, it is possible to simultaneously form the cooling blade 33 and the groove 34A while suppressing any increase in the number of components and any increase in the weight of the rotor case 23A, and despite the cooling blade 33 being provided on the end wall 31A of the rotor case 23A it is possible to prevent a bolt from becoming rusty by preventing rain water or the like from building up on the upper face of the end wall 31A while simplifying the production process and reducing the cost.

Furthermore, since the recess part 38 is formed in the central part of the upper face of the end wall 31A, and the upper end part of the rotating shaft 14 is fastened to the lower face of the bottom wall 40 of the recess part 38, it is possible to shorten the rotating shaft 14 as much as possible and lighten the weight, and it is also possible to ensure that there is a space for disposing the cooling blade 33 while suppressing the axial length of the rotor case 23A.

Furthermore, since the inner end portion 34a of the groove 34A along the radial direction of the end wall 31A is formed so as to be deeper than the recess part 38, it is possible to discharge water from the central part of the end wall 31A even in a state in which the rotor 13 is not rotating. Moreover, since the bottom part of the groove 34A is formed in an inclined manner so that it is positioned further downward in going in the radially outward direction of the end wall 31A, it is possible to discharge water from the central part of the end wall 31A more effectively.

Furthermore, since the ring-shaped yoke 24A made of a magnetic metal is fixed to the inner periphery of the side wall 32, and the plurality of permanent magnets 25 are resin-bonded permanent magnets mold bonded to the inner peripheral face of the yoke 24A by injection molding, it is possible to further lighten the weight, and it becomes easy to make the central axis of the rotor case 23A, the central axis of the rotating shaft 14, and the central axis of the inner peripheral face of the permanent magnet 25 coincide, thereby facilitating assembly of the permanent magnet 25.

Moreover, since the yoke 24A is formed into a ring shape having the slit 50 at one location in the peripheral direction, it is possible, due to the resin bonded magnet flowing into the slit 50, to prevent the permanent magnet 25 from rotating, and it becomes easy to adjust the dimensions when press fitting the yoke 24A into the rotor case 23A.

Second Embodiment

Figure 7:
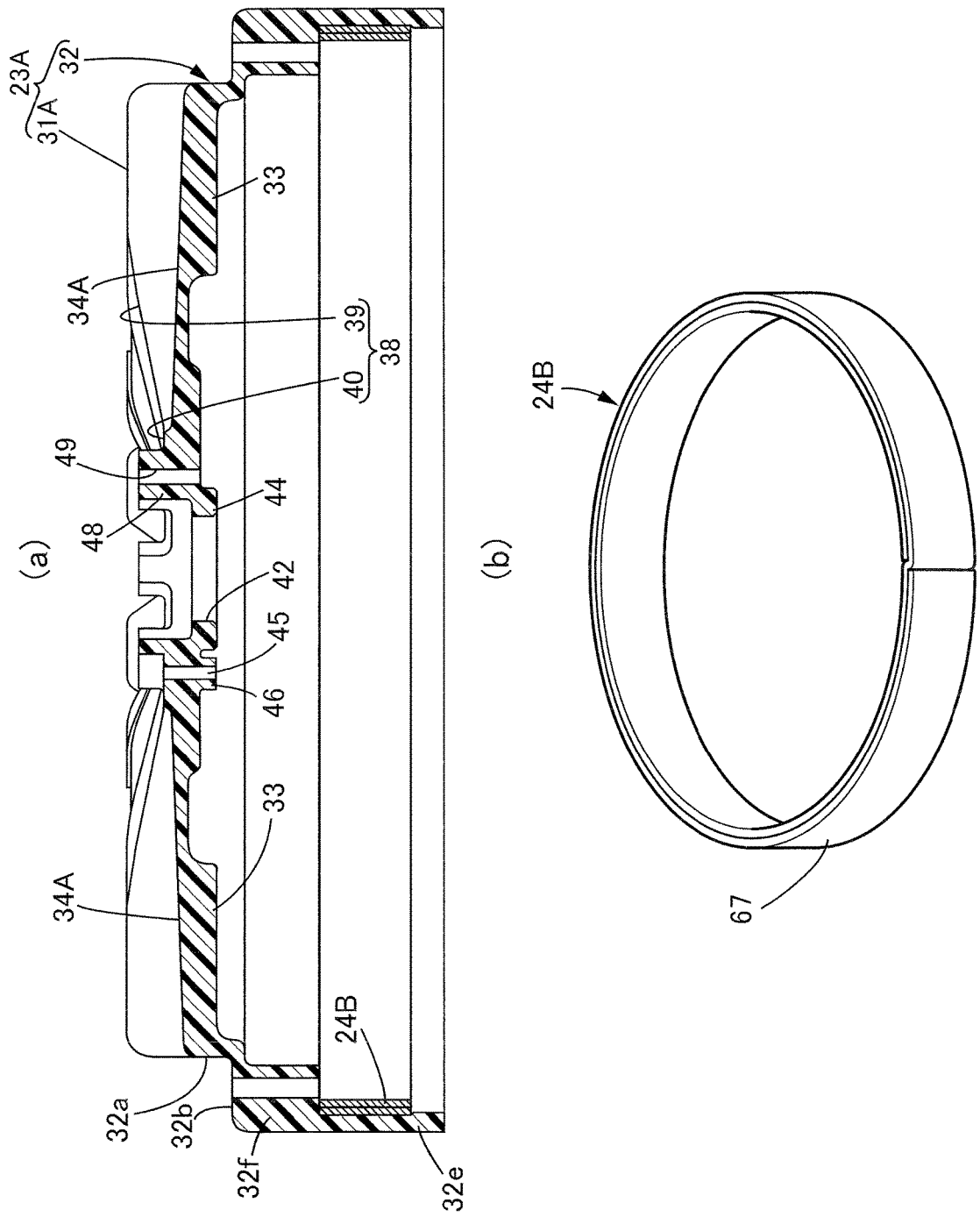
FIG. 7 shows a second embodiment, (a) being a vertical sectional view of a rotor case and a yoke and (b) being a perspective view of the yoke. (second embodiment)

As a second embodiment of the present invention, as shown in FIG. 7, a yoke 24B may be formed by winding a magnetic metal band plate 67 around a plurality of times or only once (twice in this embodiment).

Third Embodiment

Figure 8:
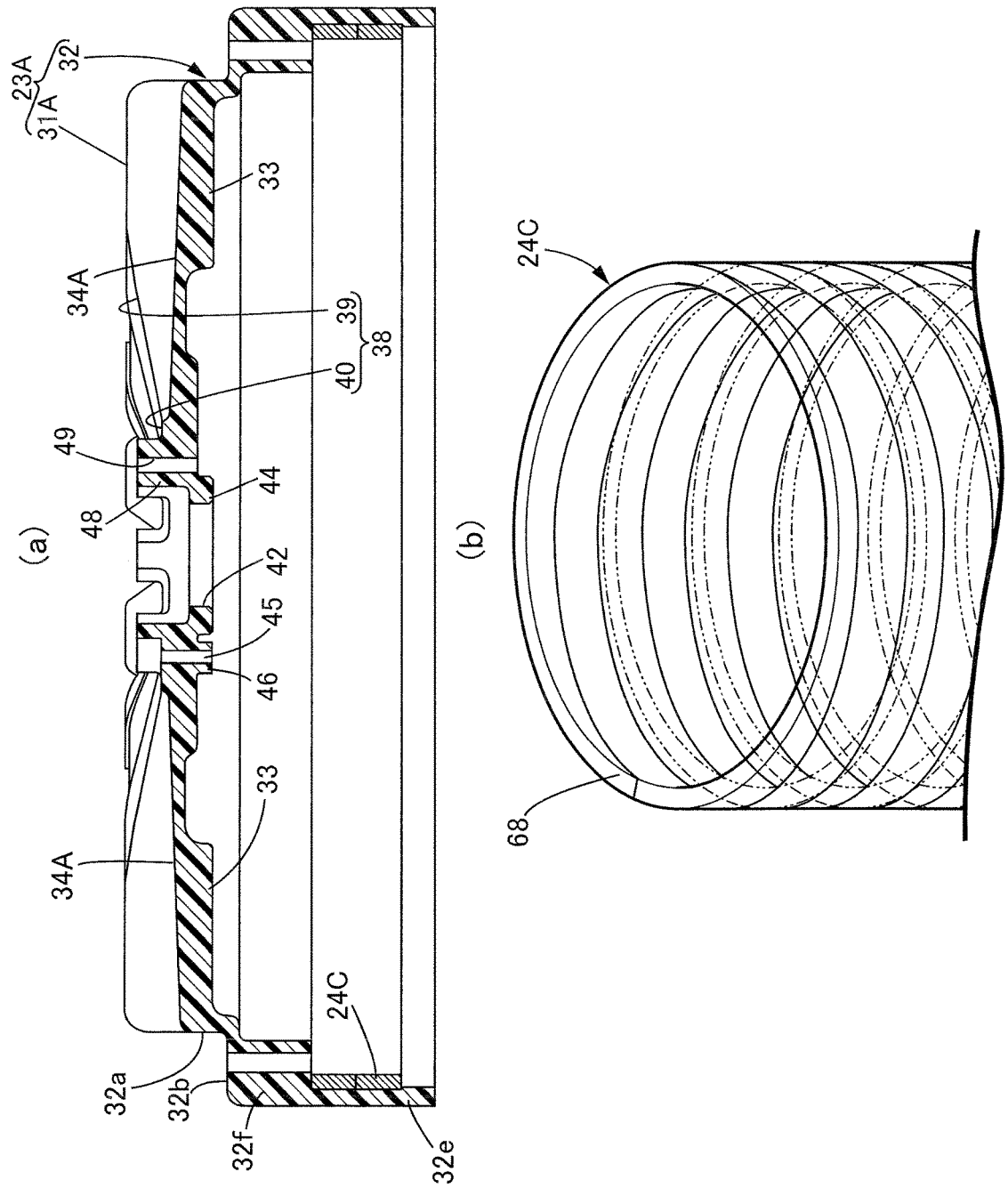
FIG. 8 shows a third embodiment, (a) being a vertical sectional view of a rotor case and a yoke and (b) being a perspective view of the yoke. (third embodiment)

As a third embodiment of the present invention, as shown in FIG. 8, a yoke 24C may be formed by winding a magnetic metal band plate 68 into a helical shape, and in this case the yoke 24C may be formed by cutting out a required length as shown by a chain line in FIG. 8 (b) from a lengthwise-extending cylindrical part that is formed by winding the band plate 68 into a helical shape.

Fourth Embodiment

Figure 9:
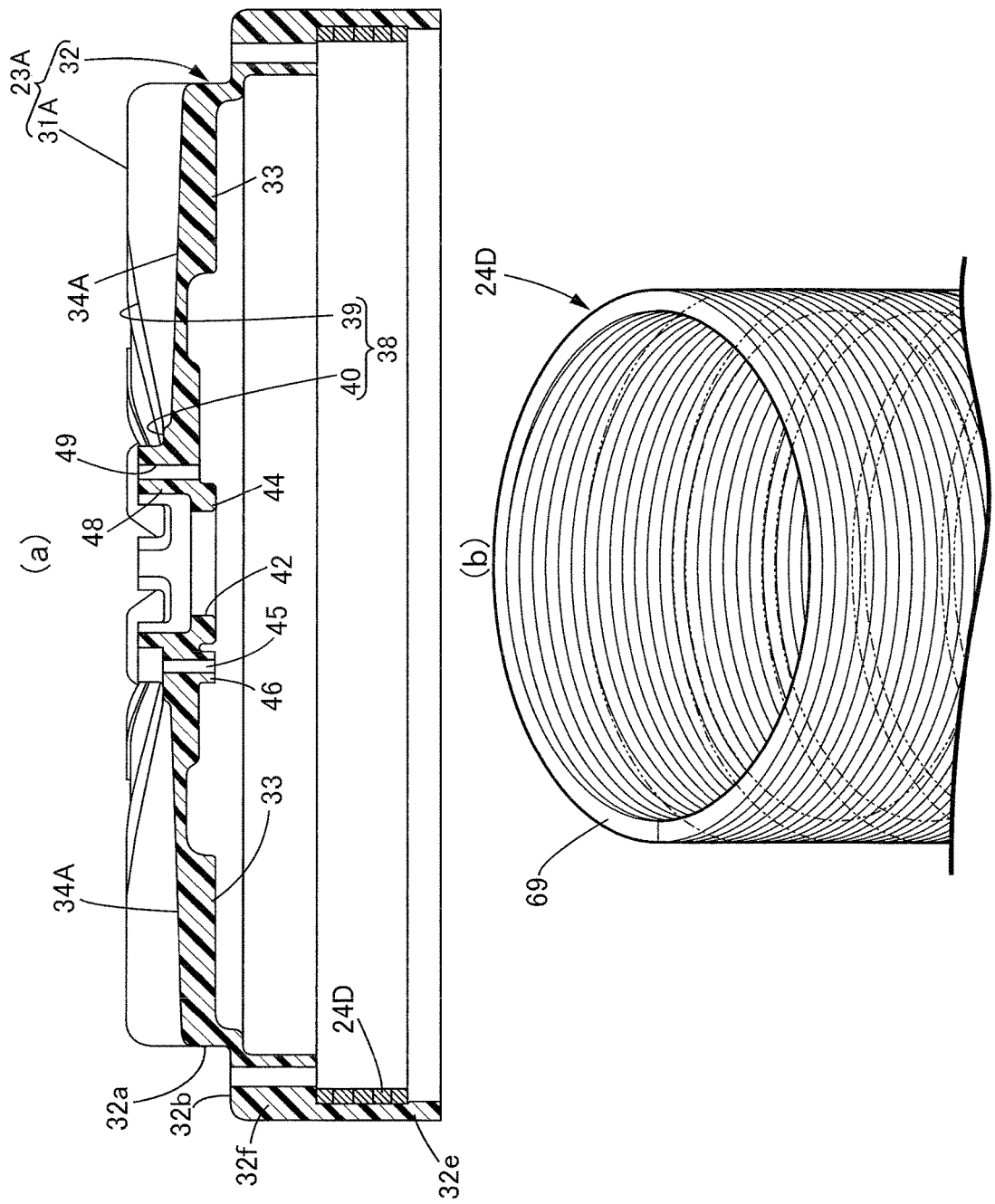
FIG. 9 shows a fourth embodiment, (a) being a vertical sectional view of a rotor case and a yoke and (b) being a perspective view of the yoke. (fourth embodiment)

As a fourth embodiment of the present invention, as shown in FIG. 9, a yoke 24D may be formed by winding into a helical shape a wire rod 69 made of a magnetic metal and having a rectangular cross-sectional shape, and in this case the yoke 24D may be formed by cutting out a required length as shown by a chain line in FIG. 9 (b) from a lengthwise-extending cylindrical part that is formed by winding the wire rod 69 into a helical shape.

Fifth Embodiment

Figure 10:
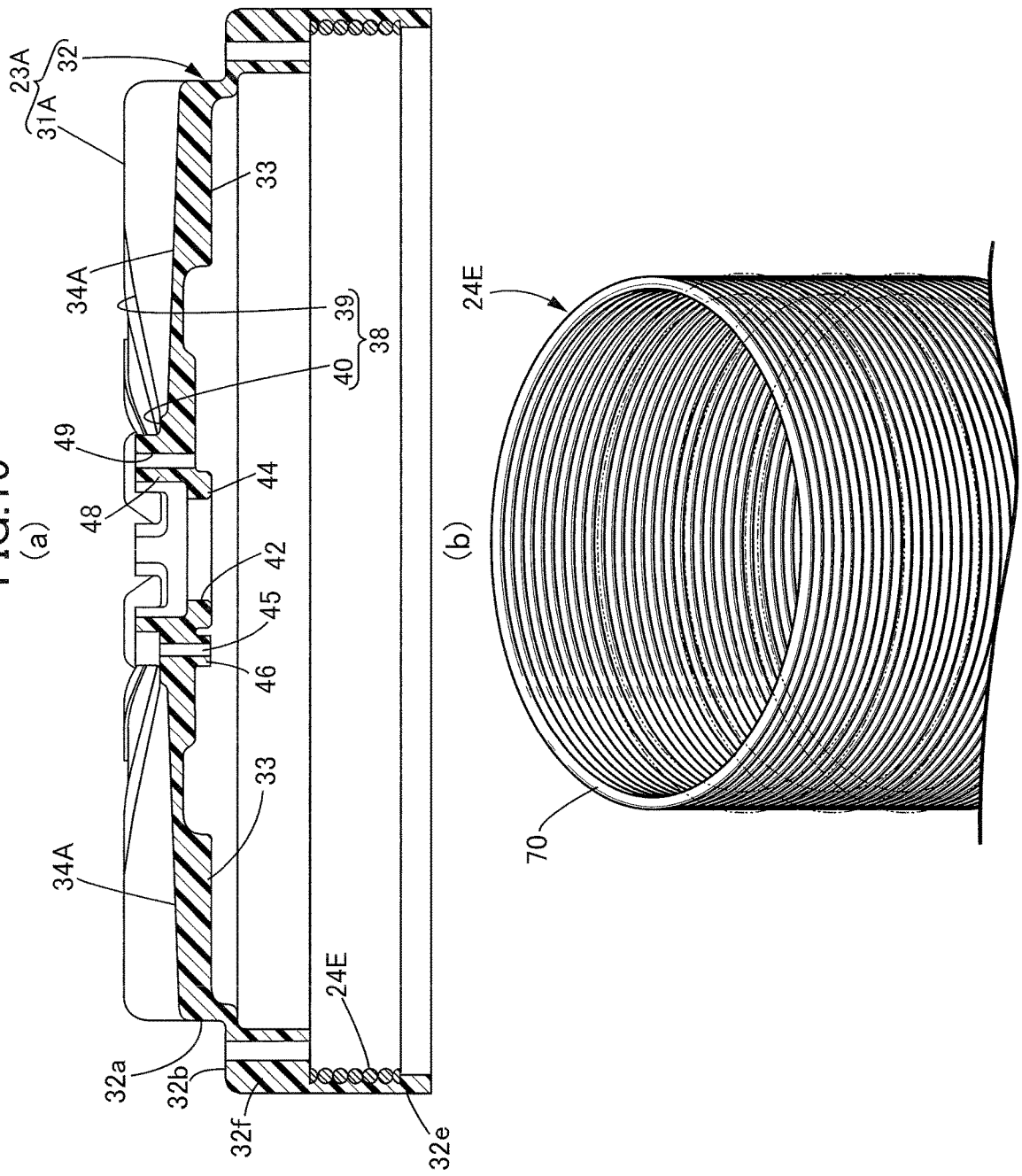
FIG. 10 shows a fifth embodiment, (a) being a vertical sectional view of a rotor case and a yoke and (b) being a perspective view of the yoke. (fifth embodiment)

As a fifth embodiment of the present invention, as shown in FIG. 10, a yoke 24E may be formed by winding into a helical shape a wire rod 70 made of a magnetic metal and having a circular cross-sectional shape, and in this case the yoke 24E may be formed by cutting out a required length as shown by a chain line in FIG. 10 (b) from a lengthwise-extending cylindrical part that is formed by winding the wire rod 70 into a helical shape. Moreover, the yoke 24E is fixed to the inner peripheral face of the third cylindrical portion 32e of the rotor case 23A by being screwed into the third cylindrical portion 32e; when carrying out this screwing, a female thread may be formed in advance in the inner peripheral face of the third cylindrical portion 32e, and by so doing it is possible to make the central axis of the yoke 24E coincide with the central axis of the rotor case 23A with good precision by enhancing the precision of the female thread. Furthermore, it is desirable that the direction in which the yoke 24E is screwed into the third cylindrical portion 32e is opposite to the rotational direction of the rotor case 23A, that is, the rotational direction of the rotating shaft 14 (see the first embodiment); by so doing an effect of further screwing the yoke 24E into the third cylindrical portion 32e is obtained in response to rotation of the rotating shaft 14, and the yoke 24E is more reliably fixed to the inner peripheral face of the third cylindrical portion 32e.

Sixth Embodiment

Figure 11:
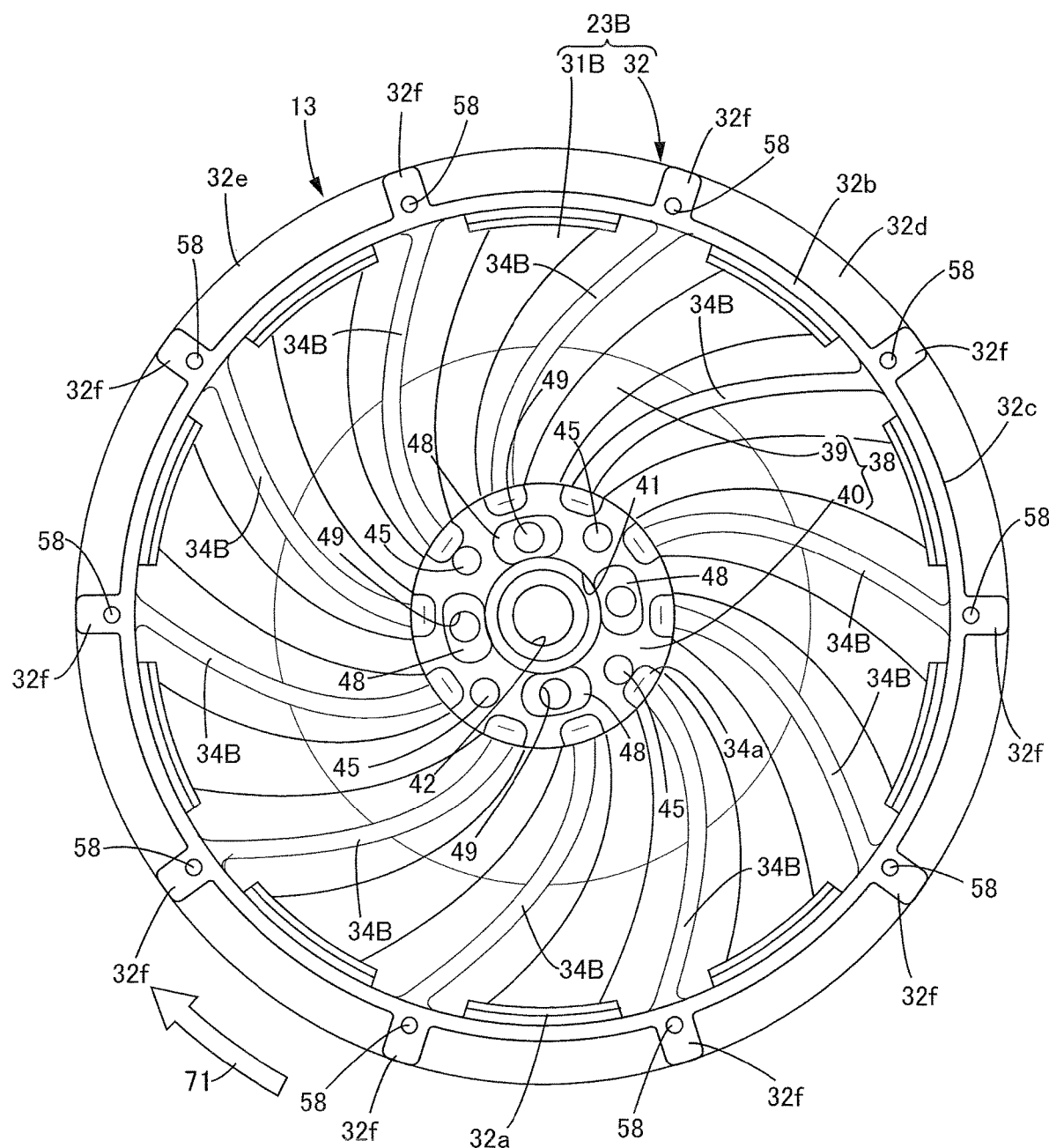
FIG. 11 shows a sixth embodiment and is a plan view, corresponding to FIG. 2, of an outer rotor electric motor. (sixth embodiment)

A sixth embodiment of the present invention is explained by reference to FIG. 11. A rotor case 23B is formed into a plate shape opening downward while integrally having a circular end wall 31B and a cylindrical side wall 32 connected to the outer periphery of the end wall 31B. A recess part 38 is formed in a central part of an upper face of the end wall 31B.

In order to discharge water from the central part of the upper face of the end wall 31B, a plurality of grooves 34B are formed in the upper face of the end wall 31B so as to extend from the recess part 38 up to the outer periphery of the end wall 31B, while having a spiral shape that is curved so as to be positioned further on the outer side in the radial direction of the end wall 31B in going forward in a rotational direction 71 of the rotor case 23B. Spiral cooling blades (not illustrated) are formed on a lower face of the end wall 31B so as to individually correspond to the grooves 34B.

In accordance with the sixth embodiment, since the cooling blade and the groove 34B are spiral, the flow of air of the rotor interior is accelerated, and the stator 12 (see first embodiment) can be cooled more effectively.

Embodiments of the present invention are explained above, but the present invention is not limited to the above embodiments and may be modified in a variety of ways as long as the modifications do not depart from the subject matter thereof.

The invention claimed is:

1. A rotor structure for an outer rotor electric motor in which a rotor comprising a rotor case formed into a plate shape having a circular end wall and a cylindrical side wall connected to an outer periphery of the end wall, and a plurality of permanent magnets fixed to an inner periphery of the side wall is disposed so as to cover from above by means of the end wall a stator fixed to a casing and so as to cover the stator from an outside by means of the side wall, and an upper end part of a rotating shaft having a vertically extending axis and being rotatably supported on the casing is fastened to a central part of the end wall by means of a fastening member having part thereof exposed to an exterior from an upper face of the end wall, wherein a plurality of cooling blades that suck in cooling air for cooling the stator from beneath the stator are provided integrally with the end wall so as to extend radially or spirally while projecting downward from a lower face of the end wall, radially or spirally extending grooves for discharging water from a central part of the upper face of the end wall are formed in the upper face of the end wall so as to individually correspond to the cooling blades, and a plurality of cooling air discharge holes that discharge air from the cooling blade to the exterior are formed in the side wall.

2. The rotor structure for an outer rotor electric motor according to claim 1, wherein a recess part is formed in the central part of the upper face of the end wall, and the upper end part of the rotating shaft is fastened to a lower face of a bottom wall of the recess part.

3. The rotor structure for an outer rotor electric motor according to claim 2, wherein an inner end portion of the groove along a radial direction of the end wall is formed so as to be deeper than the recess part.

4. The rotor structure for an outer rotor electric motor according to claim 3, wherein a ring-shaped yoke made of a magnetic metal is fixed to the inner periphery of the side wall, and the permanent magnet is a resin-bonded permanent magnet that is mold bonded to an inner peripheral face of the yoke by injection molding.

5. The rotor structure for an outer rotor electric motor according to claim 2, wherein a ring-shaped yoke made of a magnetic metal is fixed to the inner periphery of the side wall, and the permanent magnet is a resin-bonded permanent magnet that is mold bonded to an inner peripheral face of the yoke by injection molding.

6. The rotor structure for an outer rotor electric motor according to claim 1, wherein a ring-shaped yoke made of a magnetic metal is fixed to the inner periphery of the side wall, and the permanent magnet is a resin-bonded permanent magnet that is mold bonded to an inner peripheral face of the yoke by injection molding.

* * * * *